United States Patent
Olabiyi et al.

(10) Patent No.: US 10,152,970 B1
(45) Date of Patent: Dec. 11, 2018

(54) ADVERSARIAL LEARNING AND GENERATION OF DIALOGUE RESPONSES

(71) Applicant: Capital One Services, LLC, McLean, VA (US)

(72) Inventors: Oluwatobi Olabiyi, San Francisco, CA (US); Erik T. Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/891,972

(22) Filed: Feb. 8, 2018

(51) Int. Cl.
 *G10L 15/22* (2006.01)
 *G10L 13/027* (2013.01)
 *G06F 15/18* (2006.01)
 *G06N 3/08* (2006.01)
 *G10L 15/26* (2006.01)

(52) U.S. Cl.
 CPC .............. *G10L 15/22* (2013.01); *G06F 15/18* (2013.01); *G06N 3/08* (2013.01); *G10L 13/027* (2013.01); *G10L 15/265* (2013.01)

(58) Field of Classification Search
 CPC ....................................................... G10L 15/22
 See application file for complete search history.

(56) References Cited

U.S. PATENT DOCUMENTS

| | | | |
|---|---|---|---|
| 7,606,714 B2 | 10/2009 | Williams et al. | |
| 9,786,084 B1 | 10/2017 | Bhat et al. | |
| 2017/0031920 A1 | 2/2017 | Manning et al. | |
| 2017/0278135 A1 | 9/2017 | Majumdar et al. | |
| 2018/0005631 A1* | 1/2018 | Lee | G10L 15/30 |
| 2018/0047406 A1* | 2/2018 | Park | G10L 21/00 |
| 2018/0075581 A1* | 3/2018 | Shi | G06T 3/4053 |
| 2018/0082150 A1* | 3/2018 | Itou | G06K 9/6248 |

OTHER PUBLICATIONS

Goodfellow, Ian, et al. "Generative adversarial nets." Advances in neural information processing systems. 2014.*
Li, Jiwei, et al. "Adversarial learning for neural dialogue generation." arXiv preprint arXiv:1701.06547 (2017).*
Wilson, "AI Is Inventing Languages Humans Can't Understand. Should We Stop It?", Co.Design, www.fastcodesign.com/90132632/ai-is-inventing-its-own-perfect-languages-should-we-let-it, Jul. 14, 2017.

* cited by examiner

Primary Examiner — Douglas Godbold
(74) Attorney, Agent, or Firm — DLA Piper LLP US

(57) ABSTRACT

Systems and methods for generating responses to user input such as dialogs, and images are discussed. The system may generate, by a response generation module of at least one server, an optimal generated response to the user communication by applying an generative adversarial network. In some embodiments, the generative adversarial network may include a hierarchical recurrent encoder decoder generative adversarial network including a generator and a discriminator component.

13 Claims, 16 Drawing Sheets

Algorithm 1 Adversarial Generation with hredGAN

Require: A generator $G^*$ with parameters $\theta_G^*$.
Require: A discriminator $D^*$ with parameters $\theta_D^*$.
Require: Noise variance $\alpha \geq 1.0$
Input: Dialogue context, $\mathbf{X} = \{X_i\}_{i=1}^N$, sample size, $L$, exploration factor, $\alpha$, initial $eRNN$ zero state, $h_0$
for $i = 1$ to $N - 1$ do
  $X_i = (X_{i,1}, X_{i,2}, \cdots, X_i)$
  Update the context state.
  $h_i = cRNN(eRNN(X_i), h_{i-1})$
  for $l = 1$ to $L$ do
    Sample noise.
    $Z_{i,j}^l \sim (\mathcal{N}_i^l(0, \alpha I), \mathcal{N}_j^l(0, \alpha I))$
    Compute the generator output using (11).
    $Y_{i,l} = arg\,max_j \{P_{\theta_G}(Y_{i,j}^l | Y_{i,j}^{1,j-1}, Z_{i,j}^l, \mathbf{X}_i)\}_{j=1}^{T_{i,l}}$
    $T_{i,l}$ is the index for end of utterance token
  end for
  Select the response with the highest discriminator score
  $Y_i^* = arg\,max_l \{D^*(\mathbf{X}_i, Y_{i,l})\}_{l=1}^L$
end for

Table 1. Statistics of Movie Triples and Ubuntu Dialogue data sets.

| DATA SET | TRAINING | VALIDATION | TEST |
|---|---|---|---|
| MOVIE TRIPLES | | | |
| TRIPLES | 221,115 | 12,284 | 12,285 |
| AVG. UTT./TRIPLE | 3.0 | 3.0 | 3.0 |
| AVG. TOKENS/TRIPLE | 48.55 | 48.97 | 48.86 |
| AVG. UNK/TRIPLE | 0.044 | 0.050 | 0.045 |
| UBUNTU DIALOGUE | | | |
| CONVERSATIONS | 1,667,582 | 92,643 | 92,644 |
| AVG. UTT./CONV. | 4.90 | 4.92 | 4.91 |
| AVG. TOKENS/CONV. | 86.38 | 86.45 | 86.66 |
| AVG. UNK/CONV. | 1.93 | 1.92 | 1.92 |

FIG. 11

*Table 2. Generation and Discrimination Performance*

| MODEL | PERPLEXITY | $-\log D(G(\cdot))$ |
|---|---|---|
| MOVIE TRIPLES | | |
| HRED | 31.92/36.00 | NA |
| VHRED | 42.61/44.97 | NA |
| HREDGAN_u | 23.57/23.54 | 6.85/6.81 |
| HREDGAN_w | 24.20/24.14 | 13.35/13.40 |
| UBUNTU DIALOGUE | | |
| HRED | 69.39/86.40 | NA |
| VHRED | 98.50/105.20 | NA |
| HREDGAN_u | 56.82/57.32 | 10.09/10.08 |
| HREDGAN_w | 47.73/48.18 | 8.37/8.36 |

FIG. 12

Figure 4. Plot of $-\log D(G(\cdot))$ vs. exploration factor $\alpha$.

*Table 3. Autoregressive Inference Performance*

| MODEL | BLEU-2 | BLEU-4 |
|---|---|---|
| MOVIE TRIPLES | | |
| HRED | 0.23 | 0.0689 |
| VHRED | 0.26 | 0.1313 |
| HREDGAN_u | 0.28 | 0.1400 |
| HREDGAN_w | 0.34 | 0.1687 |
| UBUNTU DIALOGUE | | |
| HRED | 0.21 | 0.0894 |
| VHRED | 0.22 | 0.0902 |
| HREDGAN_u | 0.32 | 0.1233 |
| HREDGAN_w | 0.28 | 0.1171 |

ADVERSARIAL LEARNING AND GENERATION OF DIALOGUE RESPONSES

TECHNICAL FIELD

The present disclosure is generally related to the generation of automated responses to user input.

BACKGROUND

Computer generated responses to user input such as dialogue, images, and the like, are often limited in diversity and/or not particularly relevant to the user input. For example, computer generated responses to user input such as dialogue in conventional systems may include phrases such as "I don't know," "I'm sorry," and "I don't know what you are talking about," that are safe, limited in diversity and not particularly relevant to the topic of the conversation. In another example, computer generated responses to user input such as images containing stop signs in conventional systems may generate images that are safe such as images containing red signs, rather than ones that are particularly relevant.

While advances in machine learning, especially within deep neural networks, have enabled new capacity for machines to learn behavior from repository human behavioral data, existing neural network architecture and/or methodology are still limited in extracting valuable information from these large amounts of data, and continue to produce computer generated responses to user input that are limited in diversity and/or not particularly relevant to the topic of the user input (i.e., dialogue, images).

SUMMARY

Accordingly, there remains a need for the generation of computer responses to user input that are diverse and relevant to the user input (i.e., dialogue, images).

In one embodiment, a method may include performance of the steps of receiving a user communication from a user device, generating an optimal generated response to the user communication by applying a generative adversarial network, and transmitting the optimal generated response to the user communication to a user of the user device.

In another embodiment, a method may include performance of the steps of receiving a user communication by a user interface of a user device, transmitting the user communication to a server, receiving a computer generated response to the user communication that is generated by a generative adversarial network, and providing the computer generated response to a user of the user device.

In yet another embodiment, a system may include at least one server communicatively coupled to a user device by a network having a non-transitory memory storing computer-readable instructions and at least one processor. Execution of the computer-readable instructions may cause the at least one server to receive a user communication from the user device, generate an optimal generated response to the user communication by applying a generative adversarial network in a response generation module of the at least one server, and transmit the optimal generated response to the user communication to a user of the user device.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 9 is a schematic for an algorithm for a system for generating responses, in accordance with an aspect of the present disclosure.

FIG. 10 is a schematic for an algorithm for a system for generating responses, in accordance with an aspect of the present disclosure.

FIG. 11 is a data table summarizing test data used in connection for testing a system for generating responses, in accordance with an aspect of the present disclosure.

FIG. 12 is a data table summarizing performance data for testing a system for generating responses, in accordance with an aspect of the present disclosure.

FIG. 14 is a data table summarizing performance data for testing a system for generating responses, in accordance with an aspect of the present disclosure.

FIG. 15 is a data table summarizing responses for a system of generating responses, in accordance with an aspect of the present disclosure.

Figure 1:
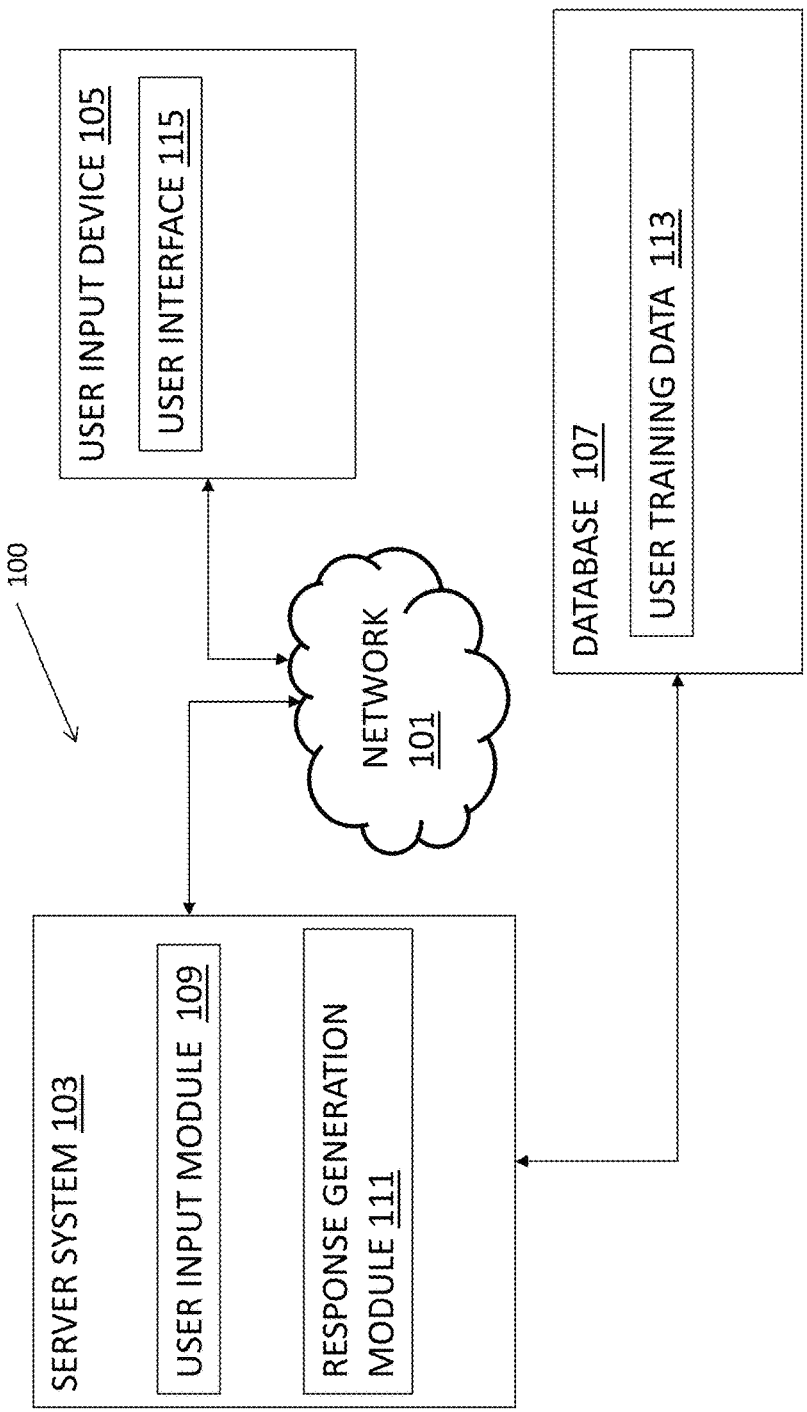
FIG. 1 is a system diagram for a system for generating responses to user input, in accordance with an aspect of the present disclosure.

The drawings are not necessarily to scale, or inclusive of all elements of a system, emphasis instead generally being placed upon illustrating the concepts, structures, and techniques sought to be protected herein.

DETAILED DESCRIPTION

The present disclosure is generally directed towards systems and methods for generating responses to user input (i.e., images, dialogues) that are both diverse and responsive to the provided user input. For example, in some embodiments, the systems and methods described herein may generate responses to user input using a machine learning module. In some embodiments, the systems and methods described herein may provide an end-to-end response generation system.

While advances in machine learning especially with deep neural networks has enabled new capacity for machines to learn behavior from repository human behavioral data, existing neural network architecture and/or methodology are still limited in extracting valuable information from these large amount data, and continue to produce computer generated responses to user input that are limited in diversity and/or not particularly relevant to the user input.

The present disclosure describes a machine learning module configured to generate an optimal generated response to the user communication by applying a machine learning approach including a hierarchical recurrent encoder-decoder generative adversarial network. The disclosed approach, a hierarchical recurrent encoder-decoder generative adversarial network, is able to produce responses to user input that is both diverse and relevant to the user input.

Machine learning modules focus on learning from, and making predictions on, data. The process by which a machine learning module learns from data may be referred to as a "training" stage. The process by which a machine learning module makes predictions on the data (based on their previous learning experience) may be referred to as an "application" or "inference" stage.

Conventional systems often produce not particularly relevant responses to the user input due in part to the criterion for the training and application stages being different. For example, conventional dialogue generation models may be trained with teacher forcing methods where during training, the generator generates the next word in the response by taking the past word from an actual human response (past input) rather than its own past output. However, during the application stage the generator may produce not particularly relevant responses to the user input because it is only able to use its own past input. This phenomenon is often referred to as the exposure bias. Additionally, conventional systems may also produce responses to user input that are limited in diversity because diversity is often not encouraged during the training stage but expected during the application stage.

To address diversity, conventional systems may apply heuristic techniques to the output of a machine learning module, however, this does not provide the same quality and quantity of diversity as introducing diversity during the training stage. Additionally, some conventional systems address diversity by using maximum mutual information (MMI) criterion, however, the machine learning techniques still provide limited diversity in generated outputs.

To address exposure bias, some conventional systems have used a scheduled sampling technique where the machine learning module is encouraged to use its own past output word as the basis to generate new responses. However, this may easily lead to instabilities.

Other conventional systems have attempted to use generative adversarial networks in a reinforcement environment in order to train the generator. While this may mitigate some of the problems associated with the exposure bias, the conventional systems still suffer from limited diversity.

In some embodiments, the machine learning module described herein may provide systems and methods that are able to converse with human subjects across a variety of topics. The disclosed machine learning module may include a hierarchical recurrent encoder-decoder generative adversarial network. During the application or inference stage, the disclosed machine learning module may include a generator which takes user input and historical data and generates or produces several possible output responses. The machine learning module may also include a discriminator that is configured to rank the generated or produced output responses from the generator based on the current user input and historical data. The process performed by the generator and discriminator may be referred to as the adversarial generation of responses.

During the training stage, the disclosed machine learning module may be trained using a generative adversarial network (GAN). In particular, the generator of the machine learning module may be trained to produce several possible responses to a user input by injecting noise into the generator along with the current user input and the historical data. In this manner, the generator may produce diverse responses that can then be ranked by the discriminator. The discriminators rankings may be provided to the generator to improve the generator's performance during the training stage. Additionally, the variety in responses produced by the generator may improve upon the discriminator's ability to discriminate and rank the generated responses, thus improving the overall performance of the discriminator during the training stage.

As opposed to conventional machine learning based modules for generating responses to user input, in some embodiments, the disclosed machine learning based module may utilize a discriminator in both the training and application stages. By contrast, existing conventional machine learning based modules may utilize a beam search during response generation.

Conventional machine learning based modules for generating responses to user input (e.g., encoder-decoder networks such as Seq2Seq) may also be limited in their ability to capture long temporal dependences in multi-turn conversations. In some embodiments, the disclosed machine learning based module may provide improved responses in multi-turn conversations by improving upon the local relevance of the generated response by including local attention. In some embodiments, local attention may be added to a hierarchical recurrent encoder decoder system to improve the local relevance of the generated response.

Conventional machine learning based modules for generating responses to user input may also employ generative adversarial networks in conjunction with maximum likelihood estimation (e.g., professor forcing). Notably, professor forcing and related conventional machine learning based techniques use utterance-level classification. In contrast to these conventional machine learning based modules, in some embodiments, the present system may use a word-level classification based discriminator and then aggregate the classification results to the utterance level. Additionally, in some embodiments, the word-level classification based discriminator may be combined with a utterance-level classification based discriminator. Additionally, unlike in conventional professor-forcing techniques where the discriminator may initialized in a zero state, in some embodiments, the disclosed machine learning based module may utilize a discriminator that is initialized based on one or more components of the generator.

Conventional machine learning based modules for generating responses to user input may also produce deterministic responses (i.e., low diversity). By contrast, in some embodiments, the disclosed machine learning based module may condition the response generation on Gaussian noise to match the response distribution in the training set.

Conventional machine learning based modules for generating responses to user input may also include complicated model training schemes. For example, in professor training, teacher forcing and auto-regressive modes may be run with shared parameters. By contrast, in some embodiments, the disclosed machine learning based module may include a generator component having a decoder that runs in teacher forcing mode only.

Reference will now be made in detail to exemplary embodiments, examples of which are illustrated in the accompanying drawings and disclosed herein. Wherever convenient, the same reference numbers will be used throughout the drawings to refer to the same or like parts.

We turn now to FIG. 1 which illustrates systems and methods for the generation of responses to user input. As illustrated, a system 100 may include a server system 103, a user input device 105, a network 101, and a database 107. In some embodiments, the server system 103 may be communicatively coupled to the user input device 105 via the network 101. In some embodiments, the server system 103 may be communicatively coupled to the database 107.

In some embodiments, the user input device 105 may include a user interface 115. A user input device may include a cell phone, tablet, desktop computer, laptop, computer device, smartphone, telephone, television, home assistant device, or any suitable device. A user of the user input device 105 may provide the user input device 105 with user input such as dialogue, text, images and the like via the user interface 115. The user interface 115 may include a software application, a website, a chat program, a telephone prompt program, a voice-based software application, and the like. The user interface 115 may also be configured to provide computer generated responses to the user input to the user. User input may be text-based, voice-based, image-based, and the like.

The server system 103 may include a user input module 109 and a response generation module 111. In some embodiments, the user input module 109 may be configured to process the user input received via the user input device 105 into a format suitable for input into the response generation module 111. For example, the user input module 109 may include voice to text translation software if the response generation module 111 is configured to receive text information.

The response generation module 111 may include a machine learning module configured with a hierarchical recurrent encoder-decoder generative adversarial network. The response generation module 111 may be configured to generate an optimal response to the user input (i.e., text, images). In some embodiments, the produced response may be capable of being provided to the user input device 105 without further processing. In other embodiments, the produced response may be capable of being provided to the user input device 105 after further processing such as creating a recording of a produced text response.

In some embodiments, an optimal response may include a response deemed to be most responsive, and relevant to a user query both locally and globally within the conversation from among a plurality of generated responses based on a ranking of each response applied by a discriminator component, for example. In some embodiments, an optimal response may be defined as the response that most closely resembles a human-generated response to the user input. In some embodiments, the response generation module 111 may be configured such that the selected optimal response does not include a subset of words (e.g., words associated with profane or controversial responses, words associated with a particular feeling such as depression).

The database 107 may include one or more data structures such as a user training data structure 113 that is configured to provide the machine learning components of the response generation module 111 with training data. In some embodiments, training data may include dialogue history between a user and a machine, transcriptions of movies, television shows, books, and the like. The training data may include conversations between people, as well as between people and computer devices.

The network 101 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

Figure 2:
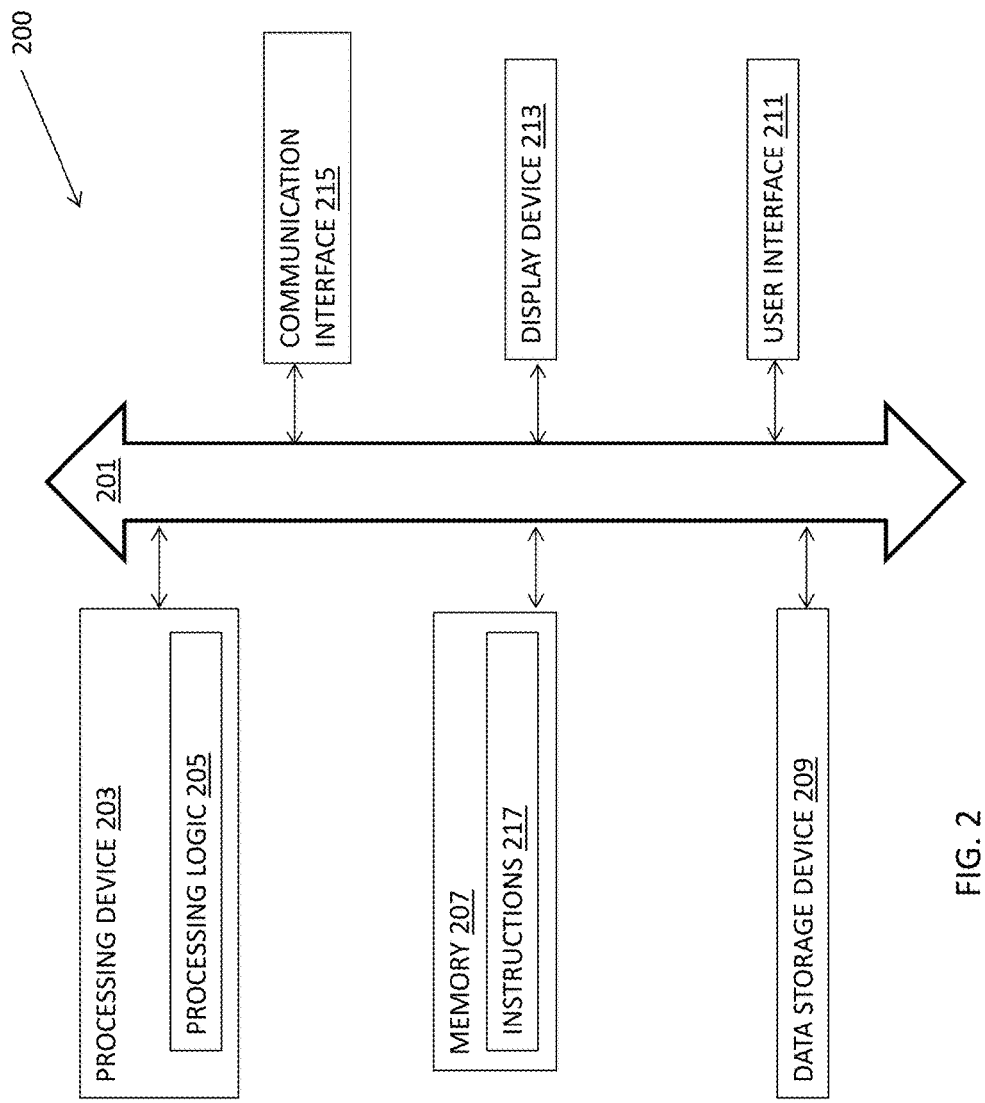
FIG. 2 is a system diagram for a computing system used in connection with the system for generating responses to user input, in accordance with an aspect of the present disclosure.

FIG. 2 illustrates a functional block diagram of a machine in the example form of computer system 200, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the user input device 105 and the server system 103 of FIG. 1 may be implemented by the example machine shown in FIG. 2 (or a combination of two or more of such machines).

Example computer system 200 may include processing device 201, memory 205, data storage device 209 and communication interface 211, which may communicate with each other via data and control bus 217. In some examples, computer system 200 may also include display device 213 and/or user interface 215.

Processing device 201 may include, without being limited to, a microprocessor, a central processing unit, an application specific integrated circuit (ASIC), a field programmable gate array (FPGA), a digital signal processor (DSP) and/or a network processor. Processing device 201 may be configured to execute processing logic 203 for performing the operations described herein. In general, processing device 201 may include any suitable special-purpose processing device specially programmed with processing logic 203 to perform the operations described herein.

Memory 205 may include, for example, without being limited to, at least one of a read-only memory (ROM), a random access memory (RAM), a flash memory, a dynamic RAM (DRAM) and a static RAM (SRAM), storing computer-readable instructions 207 executable by processing device 201. In general, memory 205 may include any suitable non-transitory computer readable storage medium storing computer-readable instructions 207 executable by processing device 201 for performing the operations described herein. Although one memory device 205 is illustrated in FIG. 2, in some examples, computer system 200 may include two or more memory devices (e.g., dynamic memory and static memory).

Computer system 200 may include communication interface device 211, for direct communication with other computers (including wired and/or wireless communication), and/or for communication with network 101 (see FIG. 1). In some examples, computer system 200 may include display device 213 (e.g., a liquid crystal display (LCD), a touch sensitive display, etc.). In some examples, computer system 200 may include user interface 215 (e.g., an alphanumeric input device, a cursor control device, etc.).

In some examples, computer system 200 may include data storage device 209 storing instructions (e.g., software) for performing any one or more of the functions described herein. Data storage device 249 may include any suitable non-transitory computer-readable storage medium, including, without being limited to, solid-state memories, optical media and magnetic media.

Figure 3A:
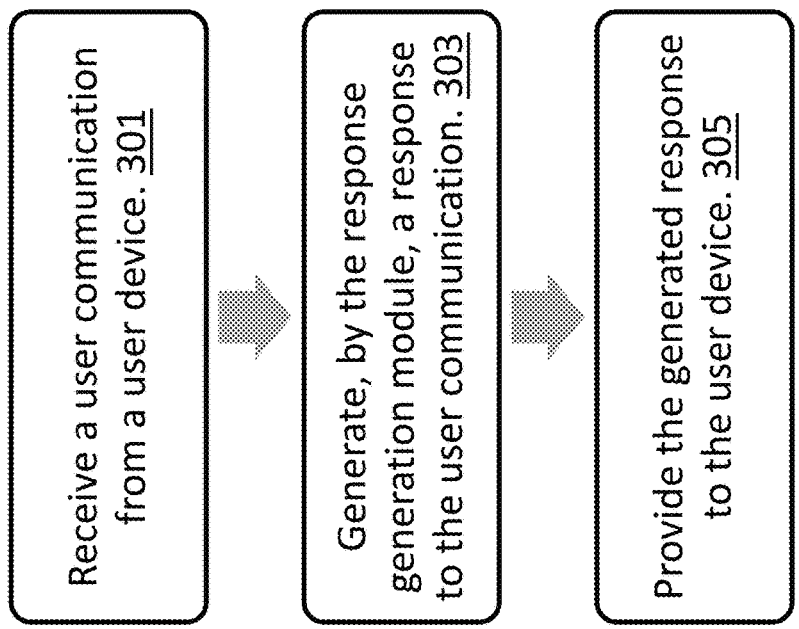
FIG. 3A is a flow chart for a process in connection with generating responses to user input, in accordance with an aspect of the present disclosure.

FIG. 3A is a flow chart for a process in connection with generating responses to user input (i.e., user communication). In step 301, a server system may receive a user communication from a user device. In step 303, the server system may generate a response to the user communication. In particular, this may be done by a response generation module. In step 305, the generated response may be provided back to the user device.

In some embodiments, the process illustrated in FIG. 3A may be embodied within the system illustrated in FIG. 1. For example, a user may query a user interface 115 (i.e., software program) on a user input device 105 (i.e., home assistant) using speech. The user input device 105 may provide the query to the server system 103 by way of the user input module 109. The server system 103 may generate a response to the query by the response generation module 111, and provide it back to the user input device 105 to communicate the response to the user via the user interface 115.

In a further example, consider the following dialogue sequence:
line 1—Human: Hey you!
line 2—Agent: Hi there!
line 3—Human: I wish I can have some food!
line 4—Agent: Are you hungry?
line 5—Human: I think so, but restaurants are usually crowded by this time of the day
line 6—Agent: Why don't you order takeout then?

In some embodiments, the human portion of the dialogue sequence (lines 1, 3, and 5) may be spoken by a user using user input device 105. Similarly, the computer portions of the dialogue sequence (lines 2, 4, and 6) may be generated by the server system 103, and more particularly by the response generation module 111, and then provided back to the user input device 105.

Figure 3B:
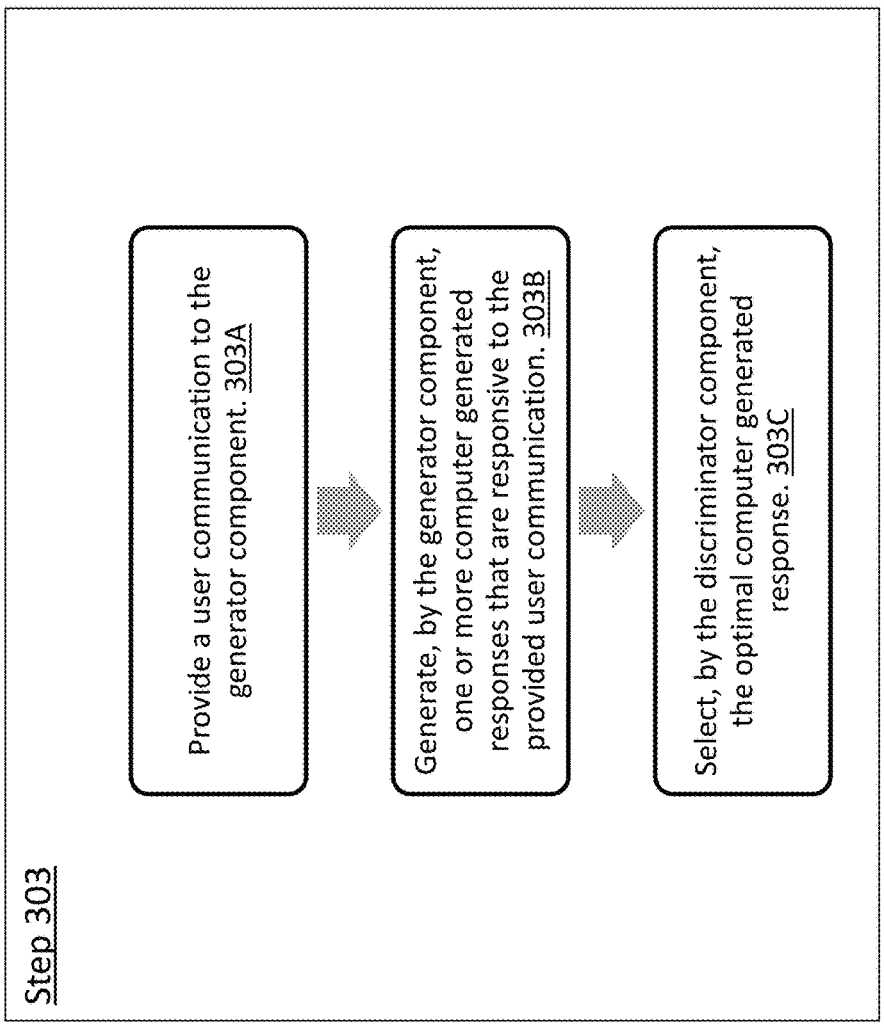
FIG. 3B is a flowchart for a sub-process in connection with generating responses to user input, in accordance with an aspect of the present disclosure.

FIG. 3B is a flowchart for a sub-process in connection with generating responses to user input. The process illustrated in FIG. 3B may be embodied within the system illustrated in FIG. 1. For example, in some embodiments, response generation module 111 may include a generator component and a discriminator component. As discussed above, the generator component and the discriminator component may form a hierarchical recurrent encoder-decoder generative adversarial network.

In some embodiments, step 303 of FIG. 3A may include one or more sub-processes that are illustrated in FIG. 3B. As illustrated in FIG. 3B, at sub-step 303A a server system may provide a user communication to a generator component of the response generation module 111. At sub-step 303B the generator component may generate one or more computer generated responses that are responsive to the provided user communication. At sub-step 303C a discriminator component of the response generation module 111 may select the optimal computer generated response.

Figure 4:
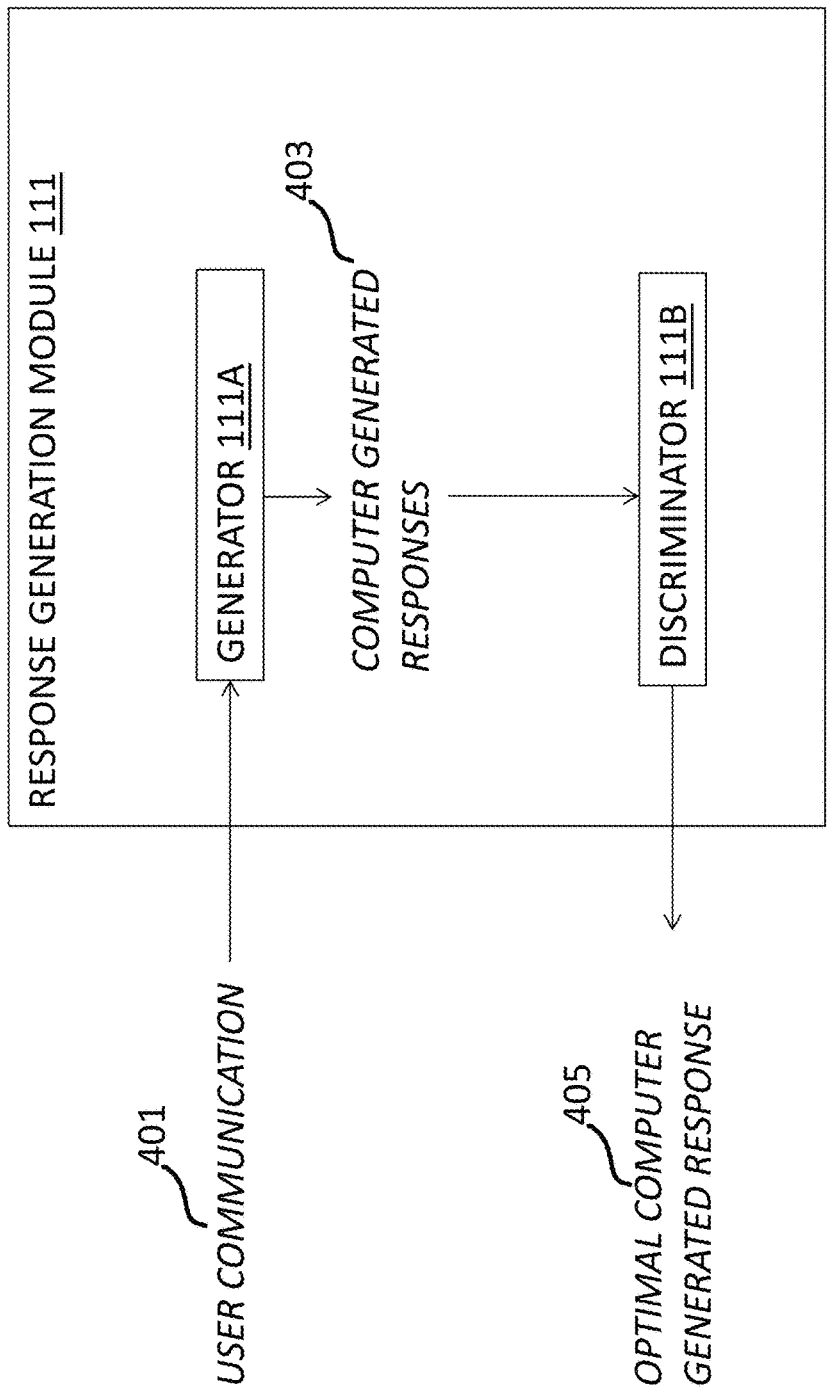
FIG. 4 is a data flow diagram for a component of a system for generating responses such as the system illustrated in FIG. 1 in an application stage, in accordance with an aspect of the present disclosure.

FIG. 4 illustrates a data flow diagram for a response generation module 111 such as the one illustrated within the system 100 of FIG. 1. In FIG. 4 the response generation module 111 is a machine learning module that is used in an application or inference stage. As illustrated in FIG. 4, the response generation module 111 may include a generator 111A and a discriminator 111B. During the application stage, after the generator 111A and the discriminator 111B have been trained, a new user communication 401 may be provided to a generator 111A component. The generator 111A may then produce a plurality of computer generated responses 403 which are responsive to the user input (i.e., the user communication 401). The discriminator 111B may then determine the optimal computer generated response 405.

In some embodiments, generator 111A and/or discriminator 111B may include or be embodied in hardware and/or software components. Generator 111A and/or discriminator 111B may include one or more recurrent neural networks and the like. For example, generator 111A may be configured with recurrent neural networks configured to place attention on the user input such that the produced response is locally relevant as well as globally relevant. In some examples, state information from the recurrent neural networks of the generator 111A may be used to initialize the state of the discriminator 111B, such that the discriminator 111B is better able to identify the most relevant responses.

In some embodiments the optimal response determined by the discriminator 111B may be the generated response deemed to be most responsive and relevant to a user query. In some embodiments, the discriminator 111B may rank the generated responses, at least in part, based on grammatical correctness, responsivity and relevancy to the user query. Responsivity and relevancy may be determined both locally and globally within the context of the conversation. In some embodiments, an optimal response may be defined as the response that most closely resembles a human-generated response to the user input. In some embodiments, the discriminator 111B may be further configured such that the selected optimal response does not include a subset of words (e.g., words associated with profane or controversial responses, words associated with a particular feeling such as depression).

Figure 5:
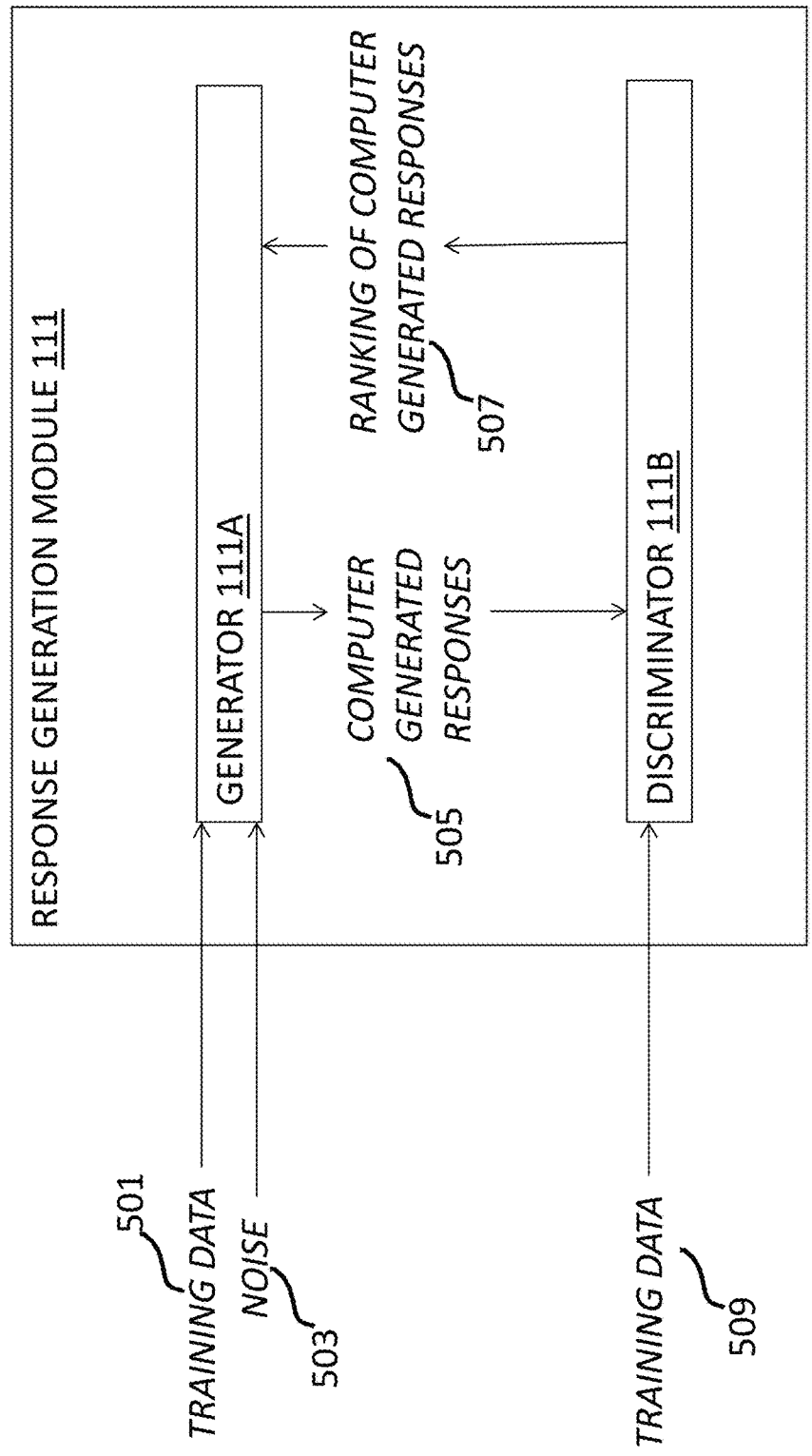
FIG. 5 is a data flow diagram for a component of a system for generating responses such as the system illustrated in FIG. 1 in a training stage, in accordance with an aspect of the present disclosure.

FIG. 5 illustrates a data flow diagram for a response generation module 111 such as the one illustrated within the system 100 of FIG. 1. In FIG. 5, the response generation module 111 is a machine learning module shown being used in a training stage. As illustrated in FIG. 5, the response generation module 111 may include a generator 111A and a discriminator 111B. During the training stage, both the generator 111A and discriminator 11B may be trained to collectively provide better computer generated responses. As illustrated in FIG. 5, the generator 111A may be provided with both training data 501 and noise 503. The training data 501 may be retrieved from the user training data structure 113 of database 107. Training data 501 may include conversational information such as dialogue between characters in a movie, television show, and the like. The training data 501 may include dialogue between a particular user and a human customer service provider, and the like. The training data 501 may also include the user input. In some embodiments, by providing the generator 111A with noise 503 in addition to the training data 501, the generator 111 may produce a more diverse range of computer generated responses 505 to the user input. The generator 111A may generate computer generated responses 505 that are provided to a discriminator 111B. During the training stage, the discriminator 111B may also receive training data 509 including the user input. The discriminator 111B may then produce a ranking of the best computer generator responses 507. The ranking of the best computer generator responses 507 may be provided back to the generator 111A so that the generator 111A may improve upon the quality of the computer generated responses 505. At the same time the discriminator 111B may improve upon its ability to distinguish what the optimal computer generated response is from among the plurality of computer generated responses 505 as the plurality of computer generated responses 505 improve in quality. In this manner the response generation module 111 and more particularly, the generator 111A and discriminator 111B structures included within the response generation module 111, may form a generative adversarial network.

Additionally, in an improvement to conventional systems, in some embodiments, the response generation module 111 may utilize the discriminator 111B during the application or inference stage.

In some embodiments, the generator 111A of the response generation module 111 may include a hierarchical recurrent encoder decoder (FIRED) and be a recurrent neural network generator.

In some embodiments, the system 100 illustrated in FIG. 1 may be used for the generation of dialogue responses. In some embodiments, a generator such as generator 111A of FIGS. 4 and 5 may include an encoder and a decoder. In some embodiments, during training, the encoder may be configured to encode information related to the dialogue history portion of the training data as in FIG. 5. In some embodiments, this information may include data at both the utterance level and the word level. Accordingly, word, sentence, grammar and construction data may be encoded. The generator may also include a decoder that is configured to condition on past dialogues. In this manner, the generator may focus attention on past utterances to generate better responses that are more relevant to the input data. In some embodiments, a discriminator such as discriminator 11B of FIGS. 4 and 5 may also include an encoder and a discriminator. The encoder of the discriminator may also include data at both the utterance level and the word level. The answers passed back to the generator during the training stage may be used in connection with a stochastic gradient descent algorithm that is configured to reduce errors when generating new responses.

Example

FIGS. 6-9 illustrate an example system for generating responses to user input. The figures illustrate conditional generative adversarial training of a hierarchical recurrent encoder-decoder-based conversation model (hredGAN). By combining maximum likelihood estimation (MLE) and a generative adversarial objective function, the systems and methods described herein are able to train a conversation model that performs in a similar fashion during both sampling and training. Furthermore, unlike existing methods that use a beam-search approach with a log-likelihood score to select the best response, the systems and methods described herein sample the noise distribution along the lines of conditional generative adversarial networks to generate several possible responses and select the one that is ranked best by the discriminator. The combined adversarial and maximum likelihood training may perform better than the traditional teacher forcing methods by (1) training faster than using just the log-likelihood objective function, and (2) producing longer, more informative and more diverse responses even with limited training data.

The disclosed example employs conditional GANs for text-to-text dialogue models with HRED generators. The disclosed generator conditions on an input utterance and dialogue history summary and generates the next utterance. Since there are two levels of exposure bias in conversation modeling, the disclosed example injects nested noise samples (from Gaussian priors) at both the utterance level and the word level. The disclosed example also employs a multi-resolution discriminator, an RNN-based word-level discriminator, and a convolutional neural network (CNN)-based utterance level discriminator.

Conditional Adversarial Generation of Dialogue Response

Figure 6:
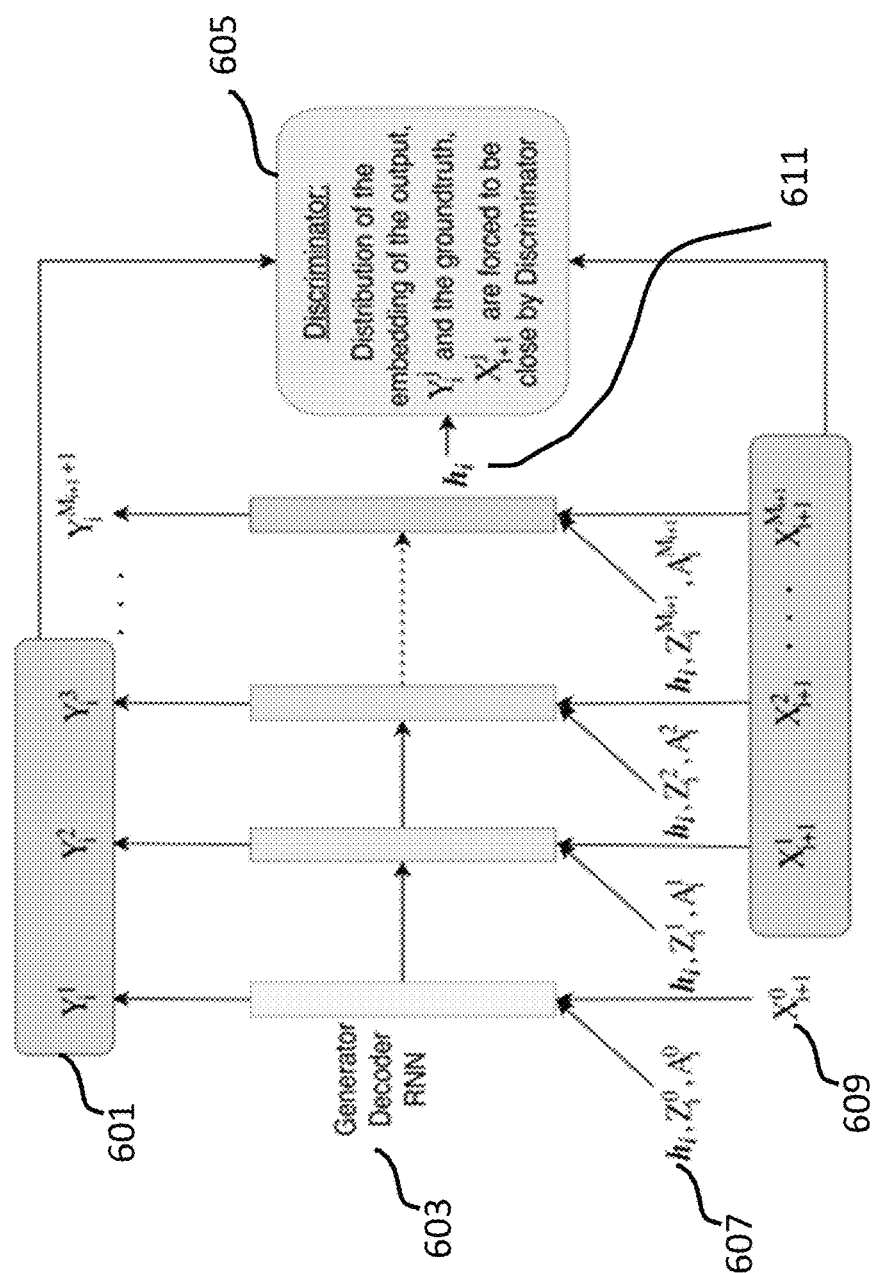
FIG. 6 is a diagram of a component of a system for generating responses such as the system illustrated in FIG. 1, in accordance with an aspect of the present disclosure.

FIG. 6 illustrates a schematic of an example hredGAN. As illustrated in FIG. 6, in a conversation with sequence of N utterances, $X=(X_1, X_2, \ldots, X_N)$, where each utterance $X_i=(X_i^1, X_i^2, \ldots, X_i^{M_i})$ contains a variable-length sequence of $M_i$ word tokens such that E V for vocabulary V. At any time step i, the dialogue history 609 is given by $X_i=(X_1, X_2, \ldots, X_i)$.

The dialogue response generation task can include the following: Given a dialogue history $X_i$, generate a response 601 $Y_i=(Y_i^1, Y_i^2, \ldots Y_i^{T_i})$, where $T_i$ is the number of generated tokens. So that the distribution of the generated response P(Y) is indistinguishable (or practically indistinguishable) from that of the ground truth $P(X_{i+1})$ and $T_i=M_{i+1}$, and given the conditioning of response generation on dialogue history and the desire to match the estimated and ground truth response distributions, the disclosed example utilizes a conditional GAN as a solution. Conditional GAN 603 learns a mapping from an observed dialogue history 609 $X_i$ and a sequence random noise vector 607 to a sequence of output tokens 601 $Y_1$, $G:\{X_i,Z_i\} \rightarrow Y_i$. The generator G 603 is trained to produce output sequences that cannot be distinguished from the ground truth sequence by an adversarially trained discriminator D 605 that is trained to do well at detecting generator's fakes.

The distribution of the generator output sequence can be factored by the product rule:

$$P(Y_i | X_i) = P(Y_i^1) \prod_{j=2}^{T_i} P(Y_i^j | Y_i^1, \ldots, Y_i^{j-1}, X_i) \quad (1)$$

$$P(Y_i^j | Y_i^1, \ldots, Y_i^{j-1}, X_i) = P_{\theta_G}(Y_i^{1:j-1}, X_i) \quad (2)$$

where $Y_i^{1:j-1}=(Y_i^1, \ldots, Y_i^{j-1})$ and $\theta_G$ are the parameters of the generator model. $P_{\theta_G}(Y_i^{j-1}, X_i)$ is an autoregressive generative model where the probability of the current token depends on the past generated sequence. Training the generator G is unstable in practice and therefore the past generated sequence is substituted with the ground truth, a method known as teacher forcing, i.e., $$P(Y_i^j | Y_i^1, \ldots, Y_i^{j-1}, X_i) \approx P_{\theta_G}(X_{i+1}^{1:j-1}, X_i) \quad (3)$$

Using (3) in relation to GAN, the disclosed example may define a fake sample as the teacher forcing output with some input noise $Z_i$ $$Y_i^j \approx P_{\theta_G}(X_{i+1}^{1:j-1}, X_i, Z_i) \quad (4)$$

and the corresponding real sample as ground truth $X_{i+1}^j$. With the GAN objective discussed below, the disclosed example will be able to bring (3) close to (2).

Objectives

In the disclosed example, the objective of a conditional GAN can be expressed as $$L_{cGAN}(G,D) = E_{X_i, X_{i+1}}[\log D(X_i, X_{i+1})] + E_{X_i, Z_i}[1 - \log D(X_i, G(X_i, Z_i))] \quad (5)$$

where G 603 tries to minimize this objective against an adversarial D 605 that tries to maximize it:

$$G^* = \arg\min_G \max_D L_{cGAN}(G, D). \quad (6)$$

It may be beneficial to mix GAN objective with a more traditional loss such as cross-entropy loss. The discriminator's job remains unchanged but the generator is tasked to not only fool the discriminator but also to be near the ground truth $X_{i+1}$ in the cross-entropy sense:

$$L_{MLE}(G) = E_{X_i, X_{i+1}, Z_i}[X_{i+1}^i \log P_{\theta_G}(X_{i+1}^{1:j-1}, X_i, Z_i)] \quad (7)$$

The final objective is $$G^* = \arg\min_G \max_D (\lambda_G L_{cGAN}(G, D)) + \lambda_M L_{MLE}(G) \quad (8)$$

Without $Z_i$, the net could still learn a mapping from $X_i$ to $Y_i$ as in professor forcing, but would produce deterministic outputs, and fail to match any distribution other than a delta function.

As illustrated in FIG. 6, the generator 603 makes one-step-ahead prediction conditioned on the dialogue history, $h_i$, attention, $A_i^j$, noise sample $Z_i^j$ 607, and ground truth, $X_{i+1}^{j-1}$ 609. The discriminator conditioned on $h_i$ 611 distinguishes between the generated output 601 $\{Y_i^j\}_{j=1}^{M_{i+1}}$ and ground truth 609 $\{X_{i+1}^j\}_{j=1}^{M_{i+1}}$. The hredGAN forces the generator to behave similarly between the training and generative modes.

Generator

The HRED generator of the disclosed example contains three recurrent structures, unlike Seq2 Seq which has two recurrent neural networks (RNN) structures. The HRED consists of the encoder (eRNN), context (cRNN), and decoder (dRNN) RNN. The conditional probability modeled by the HRED per output work token is given by $$P_{\theta_G}(Y_i^j | X_{i+1}^{1:j-1}, X_i) = dRNN(X_{i+1}^{j-1}, h_i^{j-1}, h_i) \quad (9)$$

where $h_i = cRNN$ (eRNN $(X_i)$, $h_{i-1}$), eRNN(.) maps a sequence of input symbols into fixed-length vector, and h and h are the hidden states of the decoder and context RNN respectively.

The responses generated using (9) lack local relevance to current input utterance $X_i$. Therefore, the disclosed example introduces local attention into (9) and encodes the memory differently from the context through an attention encoder RNN (cRNN) yielding:

$$P_{\theta_G}(Y_i^j | X_{i+1}^{1:j-1}, X_i) = dRNN(X_{i+1}^{j-1}, h_i^{j-1}, A_i^j, h_i) \quad (10)$$

where $$A_i^j = \sum_{m=l}^{M_i} \frac{\exp(\alpha_m)}{\sum_{m=1}^{M_i} \exp(\alpha_m)} h_i^{'m},$$

$h_i^{'m} = aRNN (X_i^m, h_i^{'m-1})$, h' is the hidden state of the attention RNN, $\alpha_k$ is either a logit projection of $(h_i^{j-1}, h_i^{'m-1})$ or $(h_i^{j-1})^T . h_i^{'m}$.

Figure 7:
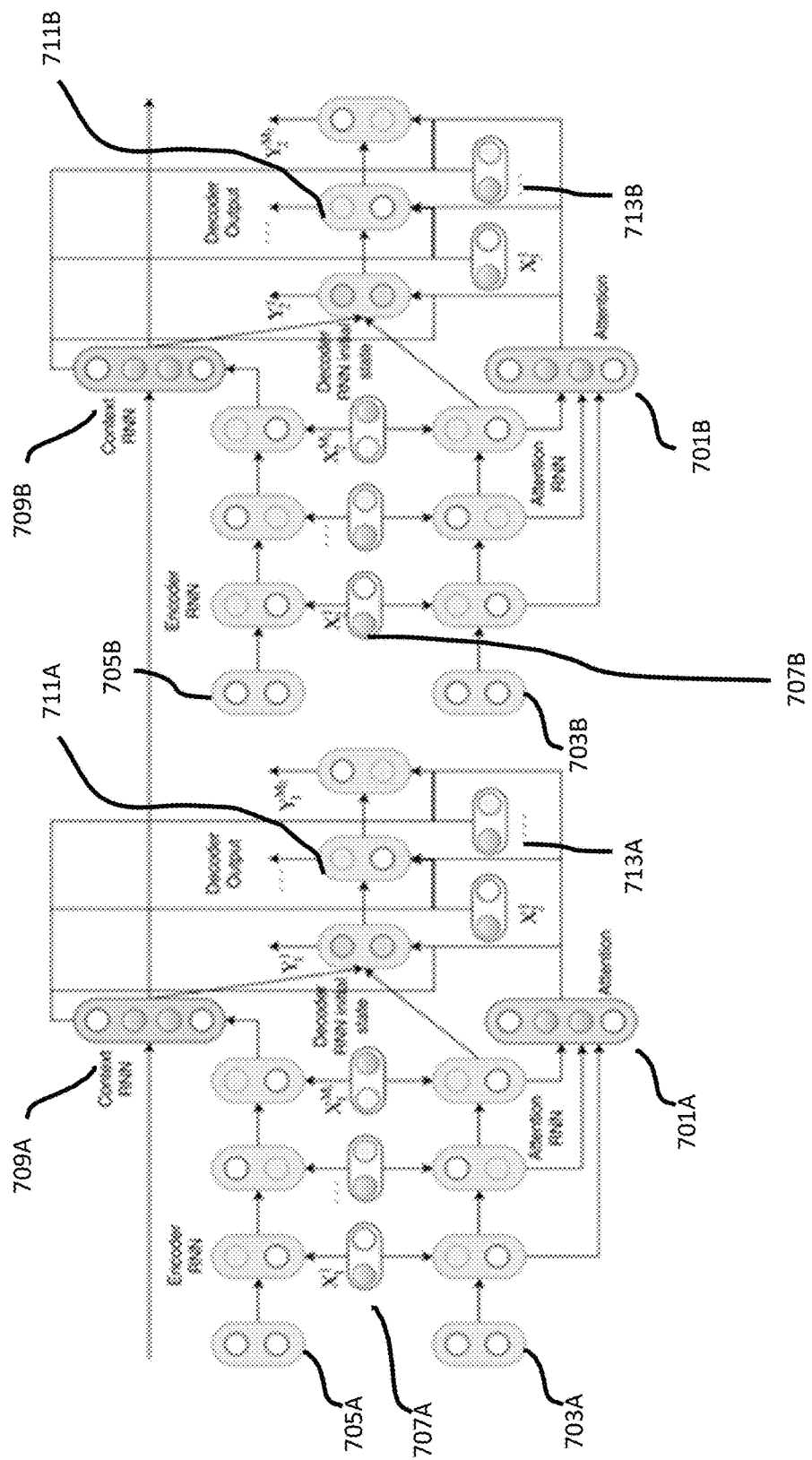
FIG. 7 is a diagram of a component of a system for generating responses such as the system illustrated in FIG. 1, in accordance with an aspect of the present disclosure.

FIG. 7 illustrates an improved HRED architecture, according to some embodiments. As illustrated in FIG. 7, the HRED may include an attention component 701A, 701B, input 703A, 703B, dialogue information 707A, 707B, context recurrent neural network 709A, 709B, and encoder recurrent neural network 705A, 705B. As illustrated, the decoder may also receive dialogue information 713A, 713B and produce decoder output 711A, 711B.

The modified HRED architecture illustrated in FIG. 7 has improved the local relevance of generated responses compared to conventional HRED. In the illustrated example, the improvement is achieved by adding an attention RNN. The attention RNN ensures local relevance while the context RNN ensures global relevance. Their states are combined to initialize the decoder RNN.

Noise Injection

In the disclosed example, Gaussian noise may be injected at the input of the decoder RNN. Noise samples could be injected at the utterance and/or word level. With noise injection, the conditional probability of the decoder output becomes $$P_{\theta_G}(Y_i^j | X_{i+1}^{1:j-1}, Z_i, X_i) = dRNN(X_{i+1}^{j-1}, h_i^{j-1}, A_i^j, Z_i^j, h_i) \quad (11)$$

Where $Zi^j = (N_i (0, I), N_1^j (0,I))$. Prior $N_i (0, I)$ is sampled once per utterance, while $N_1^j (0, I)$ is sampled per each word per utterance to be generated.

Discriminator

The disclosed example employs an independent multi-resolution discriminator that can discriminate between generator output and ground truth at both the utterance and word level. The word-level discriminator may be RNN-based and the utterance-level discriminator may be CNN-based. This allows the discriminator to capture both synthetic and conceptual difference between the generator output and the ground truth. The discriminator output can be expressed as $$D(X_i, .) = D(h_i, .) = \lambda_R D_{RNN}(h_i, .) + \lambda_C D_{CNN}(h_i, .) \quad (12)$$

where $h_i$ is an encoded vector of the dialogue history $X_i$ obtained from the generator's cRNN(.) output. Since a discriminator's outputs are binary probabilities, (12) is subject to the constraint, $\lambda_R + \lambda_c = 1$. The RNN-based discriminator can be factored over word-level discrimination. For example, the aggregate classification over the generated response sequence $Y_i$ is given by $$D_{RNN}(h_i, Y_i) = \left[\prod_{j=1}^{M_{i+1}} D_{RNN}(h_i, Y_i^j)\right]^{\frac{1}{M_{i+1}}} \quad (13)$$

Figure 8B:
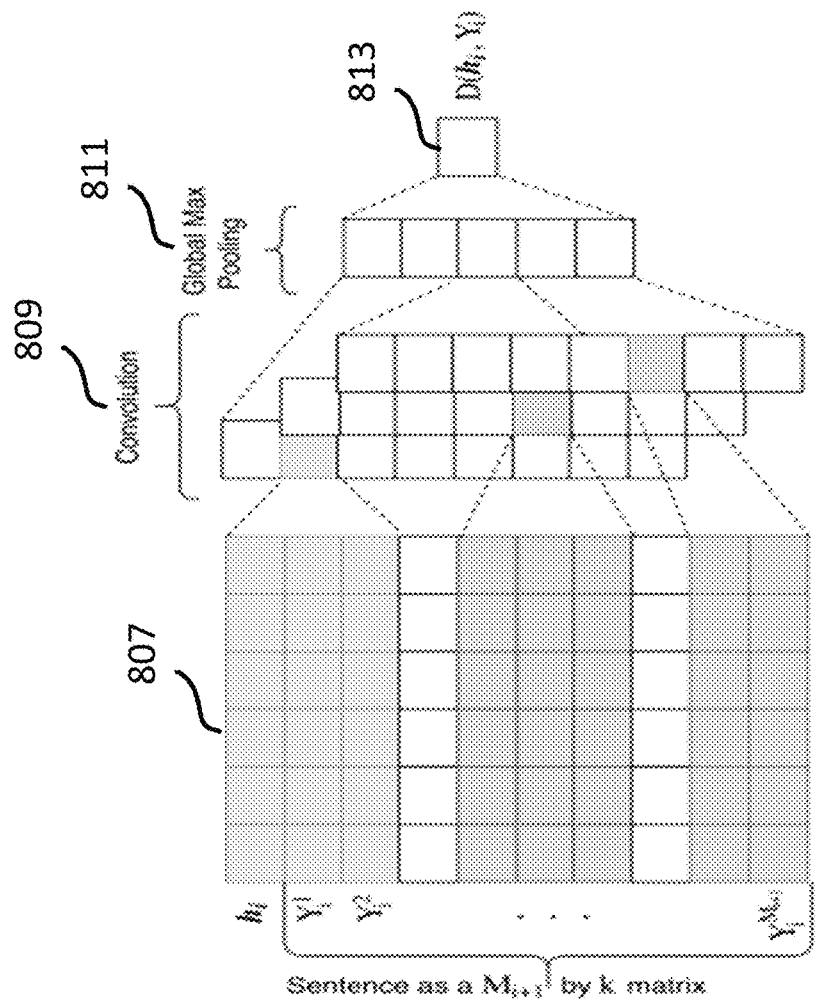
FIG. 8B is a diagram of a component of a system for generating responses such as the system illustrated in FIG. 1, in accordance with an aspect of the present disclosure.
Figure 8A:
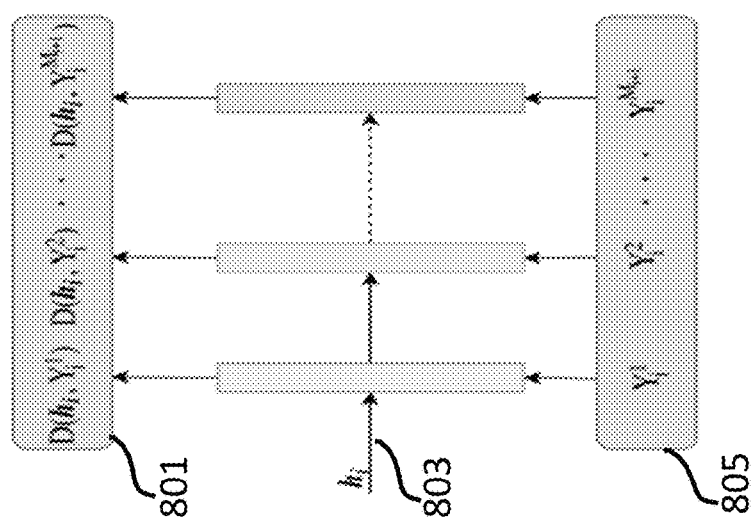
FIG. 8A is a diagram of a component of a system for generating responses such as the system illustrated in FIG. 1, in accordance with an aspect of the present disclosure.

An example discriminator architecture is depicted in FIGS. 8A and 8B. In particular, FIG. 8A illustrates a RNN-based discriminator and FIG. 8B illustrates a CNN-based discriminator. The RNN-based discriminator discriminates at the word level, while the CNN-based discriminator discriminates at the utterance level. The combined system provides multi-resolution adversarial discrimination.

As illustrated, dialogue history 803 may be provided to the discriminator along with outputs generated by the generator 805. The word-level recurrent neural network discriminator (e.g., FIG. 8A) may then produce a word level output 801. The convolutional neural network based discriminator depicted in FIG. 8B may also receive the dialogue history and outputs generated by the generator 807. The convolutional neural network based discriminator may perform one or more convolutions 809, and global max pooling 811 in order to produce an utterance level output 813.

As illustrated in FIG. 8B, for the case of CNN discriminator, the encoded dialogue history $h_i$ is concatenated with the embedded input tokens before feeding into the network. However, for the RNN discriminator illustrated in FIG. 8A, the state of cRNN is used to initialize the discriminator. Also, the initial state of dRNN is obtained by projecting combined states of aRNN and cRNN into the dimension of dRNN with tanh activation. In some embodiments, the dRNN is initialized to the state of either aRNN or cRNN, such that the generator's output loses global and local context consistency respectively. Finally, the embedding matrix for the input tokens is shared across the generator and discriminator. Accordingly, the discriminator is linked to the generator through the embedding matrix, which allows training both the generator and the discriminator in an end-to-end fashion.

Adversarial Generation of Dialogue Response

In some embodiments, the generation process during inference or application is also adversarial in nature. The generation objective can be mathematically described as $$Y_i^* = \arg\max_l \{P(Y_{i,l}|X_i) + D^*(X_i, Y_{i,l})\}_{l=1}^{L} \quad (14)$$

where $Y_{i,l} = G^*(X_i, Z_{i,l})$, $Z_{i,l}$ is the lth noise samples at dialogue step i and L is the number of response samples. Equation (14) shows that an inference objective is the same as the training objective (8), combining both the MLE and adversarial criteria. Thus, instead of discarding the discriminator during inference, in this example the discriminator is still used.

The inference described by Equation (14) may be intractable due to the enormous search space of $Y_{i,l}$. Therefore, an approximate solution may be determined using greedy decoding (MLE) on the first part of the objective function to generate L lists of responses based on noise samples $\{Z_{i,l}\}_{l=1}^{L}$. In order to facilitate the exploration of the generator's latent space, a modified noise distribution may be sampled, $Z_{i,l}' \sim N_{i,l}(0, \alpha I)$ or $Z_{i,l}' \sim N_{i,l}'(0, \alpha I)$ where $\alpha > 1.0$, is the exploration factor that increases the noise variance. The L lists may be ranked using the discriminator (still conditioned on the dialogue history). The response with the highest discriminator ranking is the optimum response for the dialogue context. The adversarial response generation steps are itemized in FIG. 9. FIG. 9 is a schematic for an algorithm for a system for generating responses as discussed above with respect to the examples also illustrated in FIGS. 6-8B.

Training of hredGAN

Figure 10:
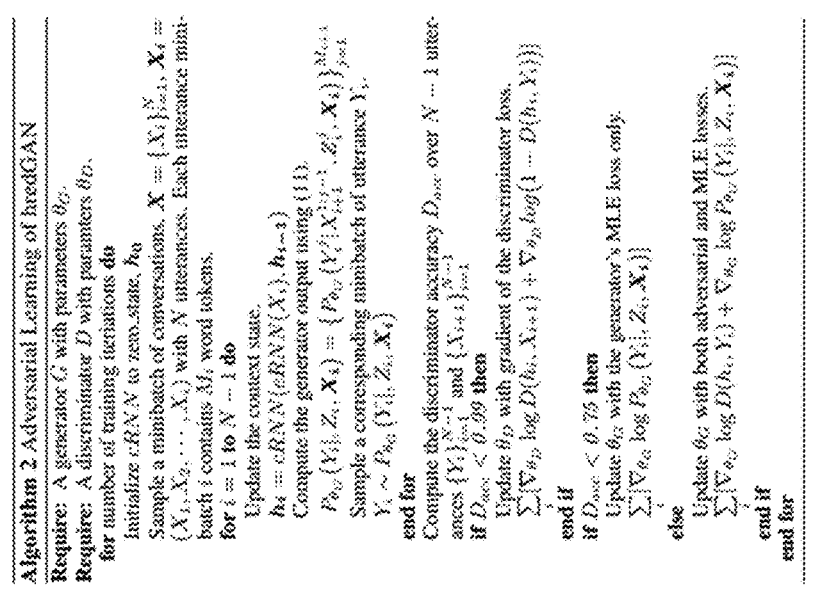

As illustrated in FIG. 10, which is a schematic for an algorithm for a system for generating responses, in the disclosed example both the generator and the discriminator are trained simultaneously. As illustrated, the generated samples are labelled as negative examples, while the corresponding ground-truth utterances are labelled as positive examples. Parameter updates are conditioned on the discriminator performance. Discriminator may only updated when its accuracy is less than about 99%. If the discriminator accuracy is less than about 75%, the generator may be updated using only the gradients from the MLE loss. Otherwise, it may be updated with gradients from the combined MLE and adversarial losses.

In the disclosed example, the generator consists of four RNNs with different parameters, that is, aRNN, eRNN, cRNN, and dRNN. aRNN and eRNN are both bidirectional, while cRNN and dRNN are unidirectional. Each RNN has 3 layers, and the hidden state size is 512. The word embedding size is 512, and the vocabulary size V is 50,000. The generator's hyperparameters are set as follows: $\lambda_G = \lambda_D = 1$.

In the disclosed example, the discriminator RNN, $D_{RNN}$, is a stacked bidirectional gated recurrent unit (GRU) with 3 layers and a hidden state size of 512. The cRNN states are used to initialize the states of the $D_{RNN}$. The output of both the forward and the backward cells for each token are concatenated and passed to a fully-connected layer with binary output. Softmax is applied to each output to compute the conditional binary probabilities given the past and future tokens. One of the softmax outputs is designated as the probability that a word is produced from the generator given the past and future words of the sequence, and the other output is designated as the probability that a word is from the ground truth given the past and future words of the sequence.

During training, in the disclosed example, the initial learning rate was 0.5 with decay rate factor of 0.99. A batch size of 64 and clip gradients around 5.0 were used during training of the disclosed example. All parameters were initialized with Xavier uniform random initialization. Also, a same word embedding matrix was used throughout the generator and the discriminator models. Due to the large vocabulary size, during training of the disclosed example the training process was expedited by using sampled softmax loss for the MLE loss. However, in the disclosed example, full softmax was used for inference. Algorithm 2 in FIG. 10 illustrates a summary of the steps used to train the proposed dialogue model. In the disclosed example two model variants (with utterance level and word level noise injections) were implemented, trained, and evaluated using the TensorFlow deep learning framework.

Experiments and Results

The disclosed example (hredGAN model) generates dialogue responses conditioned on dialogue history and current input utterance. The performance of the hredGAN model was compared against several alternatives on publicly available datasets.

Publicly available datasets include the Movie Triplets Corpus (MTC) dataset and the Ubuntu Dialogue Corpus (UDC) dataset. The MTC dataset spans a wide range of topics with few spelling mistakes, however its small size of only about 240,000 dialogue triples makes it difficult to train a dialogue model. The UDC dataset was extracted from the Ubuntu Relay Chat Channel. Although the topics in the dataset are not as diverse as in the MTC, the dataset is very large, containing about 1.85 million conversations with an average of 5 utterances per conversation. When comparing the disclosed hredGAN model against other alternatives for generating dialogue responses, both the MTC and UDC datasets were split into training, validation, and test sets, using 90%, 5% and 5% proportions respectively. The datasets were minimally pre-processed by replacing all words except the top 50,000 most frequent words by an UNK symbol. A summary of the dataset splits is provided in FIG. 11.

Automatic evaluation metrics that are used in probablistic language and dialogue models) and statistical machine translation were used to comparing dialogue model performance. Evaluation metrics include perplexity and a BLEU score.

For a model with parameter θ, perplexity may be characterized as:

$$\exp\left[-\frac{1}{N_W}\sum_{k=1}^{K}\log P_\theta(Y_1, Y_2, \ldots, Y_{N_{k-1}})\right] \quad (15)$$

where K is the number of conversations in the dataset, $N_k$ is the number of utterances in conversation k, and $N_w$ is the total number of word tokens in the entire dataset. The lower the perplexity, the better. The perplexity measures the likelihood of generating the ground truth given the model parameters. While a generative model can generate a diversity of responses, it may be desirable to assign a high probability to the ground truth utterance. Therefore, perplexity may be considered a good measure of the model's ability to account for the syntactic structure of the dialogue.

The BLEU score provides a measure of overlap between the generated response (candidate) and the ground truth (reference) using a modified n-gram precision.

The performance of the disclosed example (hredGAN model) was compared to a general hierarchical encoder decoder model (HRED) and a variable hierarchical encoder decoder model (VHRED). HRED differs from the disclosed example (hredGAN) because it does not include the input utterance attention and noise samples. VHRED differs from the disclosed example (hredGAN) because VHRED introduces a latent variable to the HRED between the cRNN and the dRNN and was trained using the variation lower bound on the log-likelihood. Additionally, the VHRED has no specific criteria for selecting the best response.

The performance of two variants of the disclosed example (hredGAN) were compared to VHRED and HRED. The two variants of the disclosed example (hredGAN) varied based on the noise injection approach, i.e., hredGAN with utterance-level (hredGAN_u) and word-level (hredGAN_w) noise injections.

The average perplexity per word performance of all the four models on MTC and UDC datasets (validation/test) are reported in the first column in the table illustrated in FIG. 12. The table indicates that both variants of the disclosed example, hredGAN model, perform better than the HRED and VHRED models in terms of the perplexity measure. Furthermore, in order to discriminate between the two variants of hredGAN, the average adversarial loss which may be defined as the sum of log-perplexity and the discriminator loss per word of the generator output was also calculated. Using the adversarial loss criterion, the hredGAN_u model performs better on MTC and worse on UDC. In this discussed example, all models were run in teacher forcing mode.

Figure 13:
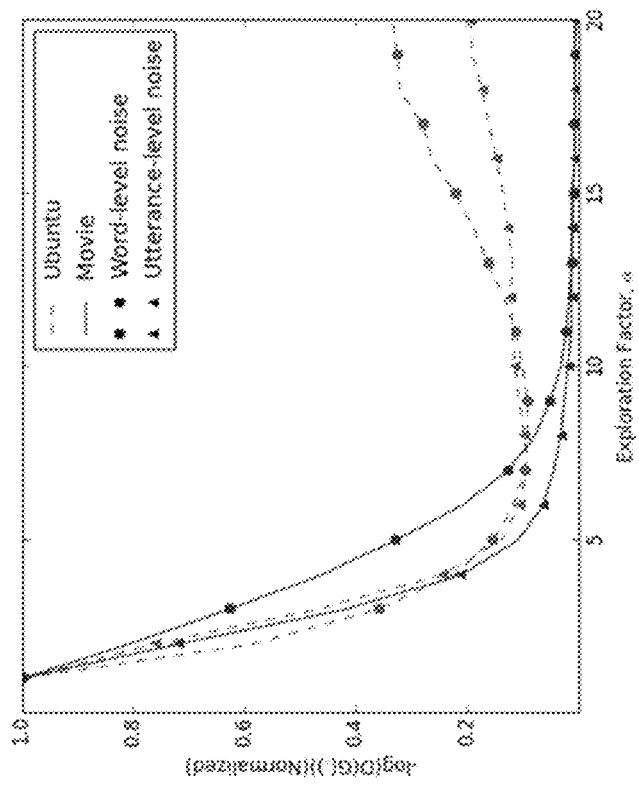
FIG. 13 is a graph illustrating performance data for testing a system for generating responses, in accordance with an aspect of the present disclosure.

For adversarial response generation using the disclosed example, a linear search for a between 1 and 20 at an increment of 1 was performed for both hredGAN models on each dataset using Algorithm 1 (see FIG. 9), with sample size, L=64. The models were run in autoregressive mode to reflect performance in actual deployment. The a value that gives the lowest average discriminator loss per word of the generator output (−log D(G(.))) over the validation set is chosen as the optimum. The plots of normalized −log D(G(.)) against the exploration factor α for different models and datasets are shown in FIG. 13. The optimum values of a for hredGAN_u and hredGAN_w for UDC are 7.0 and 9.0 respectively. The plots for MTC are not convex, probably due to the general nature of the dataset, so we use the same a values as UDC.

Figure 15:
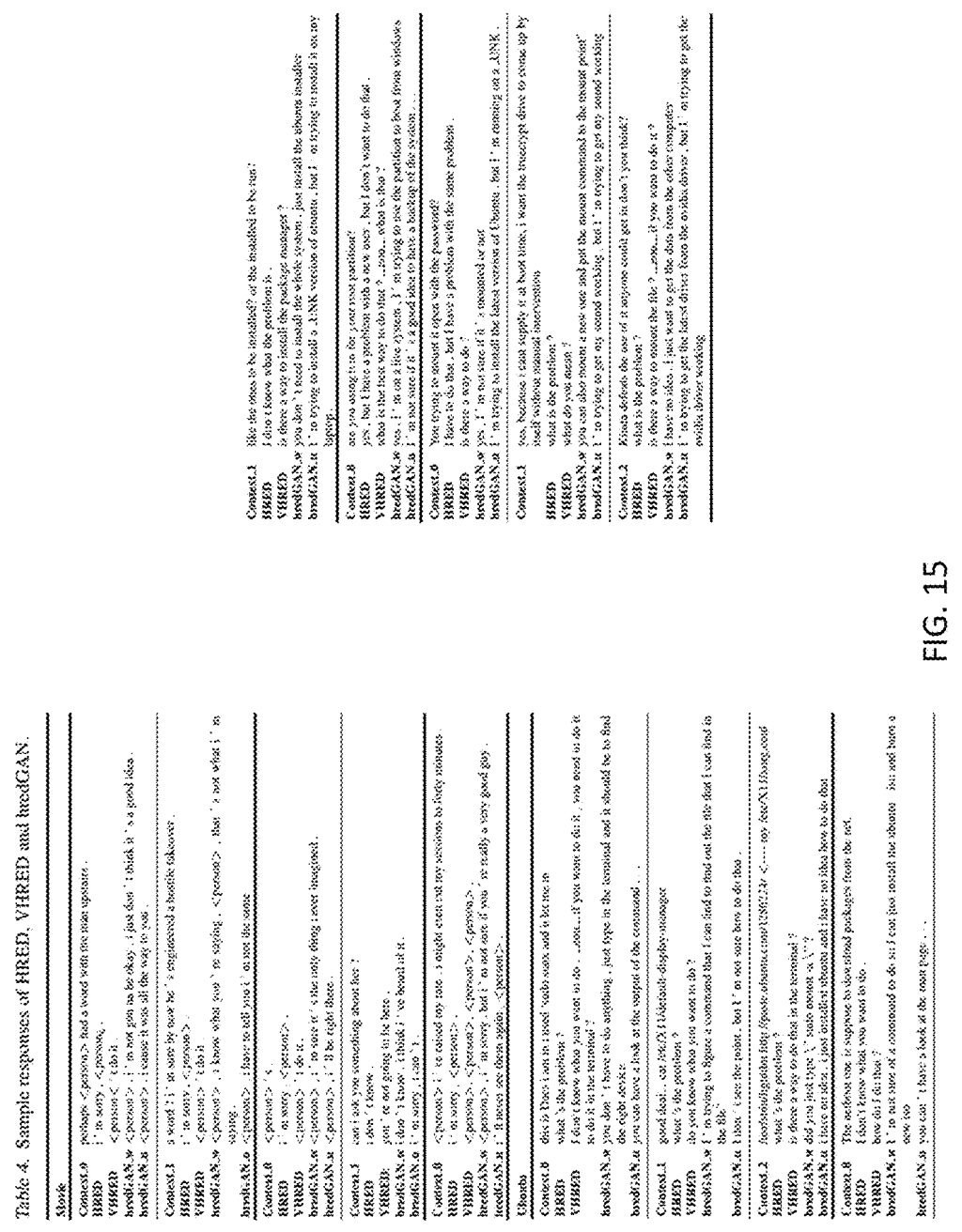

Autoregressive inference was run for all the models (using optimum a values for hredGAN models) with dialogue contexts from the test set. Samples of generated responses are provided in FIG. 15. Also, the average BLEU-2 score (between the generated responses and ground truth) and summarized results are illustrated in FIG. 14. The BLEU score, similar to the perplexity, also indicates that the hredGAN model performs better than HRED and VHRED. As illustrated the hredGAN_w model may perform better than hredGAN_u on MTC and worse on UDC. This may be due in part to the fact that high entropy generators can generate more diverse responses with a high chance of being ranked high by the discriminator and more overlap with the ground truth.

Conventional end-to-end neural network-based open domain dialogue models may use transduction frameworks adapted from neural machine translations. In conventional systems, the architecture is an encoder-decoder recurrent network (Seq2Seq) and is used to learn the source-to-target relationship between an input utterance and the output response. These conventional networks are trained end-to-end with MLE criteria using large corpora of human-to-human conversation data. Other conversation Seq2Seq models are trained with the GAN framework alone or in conjunction with MLE, otherwise known as professor forcing. Other conventional systems may use GAN's discriminator as a reward function in a reinforcement learning framework and in conjunction with MLE. Some conventional systems explored the idea of GAN with a feature matching criterion.

However, the conventional models described above are limited in their ability to capture long temporal dependencies in multi-turn conversation. Hence, the disclosed example introduced HRED models for modeling dialogue response in multi-turn conversation. Alone these HRED models suffer from exposure bias since they are trained with MLE criteria in teacher forcing mode. To address these problems, the disclosed example utilizes a combination of HRED generation models and professor forcing adversarial training.

As discussed above, the disclosed example added local attention to HRED to improve the local relevance of the generated response. Accordingly, the initial state of the decoder RNN is a combination of the context RNN and attention RNN states.

Additionally, by using a multiresolution discriminator with both utterance- and word-level classification, the disclosed example is unlike professor forcing, which uses only utterance-level classification. In the disclosed example, the word-level discriminator is an RNN with initial condition set to the state of the context RNN. Additionally, the utterance-level discriminator is a CNN and the input embedding sequence is concatenated with the context RNN output.

Additionally, in the disclosed example the initial state of the discriminator RNN is set to the state of the context RNN. This is in contrast to professor forcing, where the discriminator RNN is initialized with a zero state.

In the disclosed example, the response generation is conditioned on Gaussian noise to match the response distribution in the training set, unlike professor forcing, which only produces a deterministic response.

Additionally, the disclosed example may run the decoder RNN in teacher forcing mode only, simplifying the model training, unlike professor forcing, which runs both teacher forcing and autoregressive modes with shared parameters.

Modules may include specially configured hardware and/or software components. In general, the word module, as used herein, may refer to logic embodied in hardware or firmware or to a collection of software instructions. Generally, the modules described herein refer to logical modules that may be combined with other modules or divided into sub-modules despite their physical organization or storage.

In some examples, some or all of the logic for the above-described techniques may be implemented as a computer program or application or as a plug-in module or sub component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

We claim:

1. An improved method for generating responses to user communications comprising:
   receiving, by at least one server communicatively coupled to a user device, a user communication;
   applying, by a response generation module of the at least one server, a generative adversarial network to the user communication to generate an optimal generated response to the user communication, the generative adversarial network comprising a generator component and a discriminator component, wherein said discriminator component comprises a convolutional neural network and a recurrent neural network, wherein applying the generative adversarial network comprises:
   generating, via the generator component, a plurality of computer generated responses responsive to the user communication, and
   selecting, via the discriminator component, an optimal computer generated response from among the generated plurality of computer generated responses; and
   transmitting, by the at least one server, the optimal generated response to the user communication to a user of the user device.

2. The method of claim 1, further comprising training the generative adversarial network by:
   providing training data to the generator component of the generative adversarial network,
   generating, by the generator component, computer responses to the training data,
   evaluating, by the discriminator component of the generative adversarial network, the generated computer responses by at least one comparison to the training data,
   ranking, by the discriminator component, the generated computer responses, and
   adjusting one or more parameters of the generator component based on the ranking of the generated computer responses.

3. The method of claim 2, wherein the training data further comprises noise.

4. The method of claim 1, wherein the generator component further comprises a local attention component.

5. The method of claim 1, wherein at least one of the generator component and the discriminator component further comprises an encoder and a decoder.

6. An improved method for providing computer generated responses to user communications comprising:
   receiving, by a user interface of a user device, a user communication;
   transmitting, by the user device, the user communication to at least one server communicatively coupled to the user device;
   receiving, by the user device, a computer generated response to the user communication, wherein the computer generated response is generated by applying an generative adversarial network to the user communication, the generative adversarial network comprising a generator component and a discriminator component including a convolutional neural network and a recurrent neural network, wherein applying the generative adversarial network comprises:
   generating, via the generator component, a plurality of computer generated responses responsive to the user communication, and
   selecting, via the discriminator component, an optimal computer generated response from among the plurality of computer generated responses; and
   providing, by the user interface, the computer generated response to a user of the user device.

7. The method of claim 6, wherein the computer generated response is of the same communication type as the user communication.

8. The method of claim 6, wherein at least one of the generator component and the discriminator component further comprises an encoder and a decoder.

9. An improved system for generating responses to user communications comprising:
- at least one server communicatively coupled to a user device by a network, wherein the at least one server further comprises a non-transitory memory storing computer-readable instructions and at least one processor;
- the execution of the computer-readable instructions causing the at least one server to:
- receive, from the user device, a user communication;
- apply, by a response generation module of the at least one server, an generative adversarial network to the user communication to generate an optimal generated response of the user communication, the generative adversarial network comprising a generator component and a discriminator component, wherein said discriminator component comprises a convolutional neural network and a recurrent neural network, and wherein application of the generative adversarial network further comprises:
  - generation, via the generator component, of a plurality of computer generated responses responsive to the user communication, and
  - selection, via the discriminator component, of an optimal computer generated response form among the plurality of computer generated responses; and
- transmit the optimal generated response to the user communication to a user of the user device.

10. The system of claim 9, wherein the optimal generated response is of the same communication type as the user communication.

11. The system of claim 9, wherein the generator component and the discriminator component are trained by the steps of:
- providing training data to the generator component of the generative adversarial network,
- generating, by the generator component, computer responses to the training data,
- evaluating, by the discriminator component of the generative adversarial network, the generated computer responses by at least one comparison to the training data,
- ranking, by the discriminator component, the generated computer responses, and
- adjusting one or more parameters of the generator component based on the ranking of the generated computer responses.

12. The system of claim 9, wherein at least one of the generator component and the discriminator component further comprises an encoder and a decoder.

13. The system of claim 9, wherein the generator component further comprises a local attention component.

* * * * *